United States Patent [19]

Sailer et al.

[11] Patent Number: 4,624,353
[45] Date of Patent: Nov. 25, 1986

[54] FRICTION DEVICE

[75] Inventors: Hubert Sailer, Markdorf; Friedrich J. Ehrlinger, Friedrichshafen; Josef Dietenberger, Aulendorf, all of Fed. Rep. of Germany

[73] Assignee: Zahnradfabrik Friedrichshafen AG, Friedrichshafen, Fed. Rep. of Germany

[21] Appl. No.: 647,771

[22] Filed: Sep. 5, 1984

[30] Foreign Application Priority Data

Sep. 5, 1983 [WO] PCT Int'l Appl. .................. PCT/EP83/00232

[51] Int. Cl.[4] ............................................. F16D 13/72
[52] U.S. Cl. ............................ 192/70.12; 188/264 D
[58] Field of Search ............ 192/70.12, 70.23, 85 CA, 192/70.28, 85 AA, 99 A, 106 F, 113 B; 188/71.6, 264 D, 264 E, 264 R

[56] References Cited

U.S. PATENT DOCUMENTS

| 834,499 | 10/1906 | Sturtevant | 192/70.23 |
|---|---|---|---|
| 2,755,903 | 7/1956 | McAninch et al. | 192/85 AA |
| 3,648,811 | 3/1972 | LaFlame | 192/58 B |
| 4,022,298 | 5/1977 | Malinowski | 192/113 B X |
| 4,270,647 | 6/1981 | Leber | 192/113 B |
| 4,308,940 | 1/1982 | Cadee | 192/70.12 X |
| 4,373,622 | 2/1983 | Micheal | 192/85 AA |
| 4,529,073 | 7/1985 | Lewis | 192/85 AA X |

*Primary Examiner*—George H. Krizmanich
*Attorney, Agent, or Firm*—Karl F. Ross; Herbert Dubno

[57] ABSTRACT

A friction clutch or brake includes at least one friction disk which is engageable by a piston to provide a braking effect of the disk. In order to cool the friction disk when the piston engages with the disk, a valve arrangement is arranged which injects oil onto the disk and through an opening provided in the disks. The actuation of the valve arrangement is provided in response to the piston, i.e. when the piston is moved towards the brake disks, the valve arrangement opens a channel through which the oil is injected toward the disks. In order to avoid a collection of oil in the vicinity of the disks after the braking action is terminated, the disks are provided with a toothed profile which discharges continuously oil to an external space and thus away from the friction disk. Thus no drag moments occur which are caused through oil adhering between the friction areas.

20 Claims, 5 Drawing Figures

FRICTION DEVICE

FIELD OF THE INVENTION

Our present invention relates to a friction device and, more particularly, to a friction brake or friction clutch which is provided with an auxiliary cooling system.

BACKGROUND OF THE INVENTION

German patent DE-PS 28 02 676 describes a closing device for clutches running in an oil bath. The dosing device is provided with a slider which cooperates with a piston in such a manner that upon engagement of the piston on respective friction disks, the slider opens an internal channel within the shaft so as to supply additional oil pressure to the friction disks.

This arrangement has, however, several disadvantages. Since an internal channel is provided in the shaft, the strength of the latter is reduced and can be compensated only by overdimensioning the shaft, i.e. by providing the shaft with a larger diameter. This leads however to the need for larger bearings which is contrary to the desire to provide a relatively small structural unit.

Moreover, the piston stroke is considerable in order to sufficiently open the slider, a fact which again leads to a larger structural unit. Apart from this, a larger piston stroke demands a larger amount of pressure fluid which may not be available when referring to hydraulic actuation of the foot pedal without a displacement-ratio transmission in the pedal path. Finally, the earlier device does not prevent oil moistening of the friction disks when no actuation occurs so that energy-consuming drag torque will be present continuously.

OBJECT OF THE INVENTION

It is thus the object of our present invention to provide an improved friction device, especially a friction clutch or friction brake, obviating the aforestated drawbacks.

SUMMARY OF THE INVENTION

We realize this object and others which will become apparent hereinafter, in accordance with the present invention, by providing a valve arranged between the housing of the friction device and the shaft and which controls in dependence on the position of the piston the flow of a fluid through a channel in direction toward through-openings provided in the friction disks.

The use of valves controlled by the actuating piston allows operation with high fluid pressure so that a quick cooling effect is obtained also in view of the fine distribution of the fluid e.g. oil. This is achieved without necessitating a considerable valve stroke and in contrast to prior art arrangement, the supply of oil is independent of the design of the shaft.

According to this invention, moreover, the friction disks are provided with the respective through-opening at their outer periphery. The outlet of the channel which is controlled by the valve and through which the fluid is injected toward the friction disks is provided at a location approximately at the same level (radius or distance from the axis of rotation) as the through-openings so that the fluid is injected therethrough thus causing an intense cooling and simultaneous braking effect. In order to avoid a collecting of the fluid, the outer circumference of the disks is provided with a toothed profile.

Consequently, when no braking action takes place, the fluid is continuously discharged from the area of the disks and supplied to a return pipe. Since fluid or oil is removed from the brake its use as a parking brake (no oil supply) provides a higher brake torque in comparison to a simple splash lubrication.

It is preferred to surround the brake disks by an annular collar which is part of a counter plate against which the brake disks are pressed and which is provided as an external lamellar support. Such a design avoids a backflow of the fluid and since the annular collar accommodates a plurality of return springs acting on the piston which upon a braking action presses the disks against the counter plate, a relatively small structural unit is achieved which requires a short brake path as necessitated especially when direct actuation of the pedal is concerned.

Yet according to another feature of the invention, the valve is accommodated in a separate flanged ring so that the use of such a cooling system for brakes with conventional dry-cooling system can be obtained without changing the housing of the brake or the shaft in a relevant manner.

We have also found that it is especially advantageous to open the valve prior to the moment when the piston engages with the brake disks and to delay the return of the valve into its closing position after the piston is already disengaged and forced into its initial position under the action of the springs. Consequently, an unintentional dry operation during considerable stress of the friction areas is avoided which could otherwise cause extensive damage, and, in addition, the disks will be cooled even after the braking process has been terminated. The earlier actuation of the valve is obtained by the hydrostatic connection of the valve to the brake cylinder in which the piston is guided.

The use of such valves is possible in all friction brakes and friction clutches employing rotating disks and such valves reduce energy losses obtained by viscous oil especially at cold conditions when no braking action takes place. In addition, these valves diminish the need of maintenance in comparison to brakes running at dry conditions.

It is obvious that vehicles using e.g. brakes according to the invention will be safer and more dependable since the brakes are carefully treated, and in view of their insensitivity against wetness, dust etc. can be used in manifold ways. Such a brake has the further advantage that it can be accommodated in a relatively small structural unit without modification of other gear elements like shaft or brake disk support etc. We may note that a vehicle thus equipped is suitable for use in flooded regions e.g. in rice fields, streambeds etc.

BRIEF DESCRIPTION OF THE DRAWING

The above and other features of our present invention will now be described in detail with reference to the accompanying drawing in which.

SPECIFIC DESCRIPTION

Figure 1:
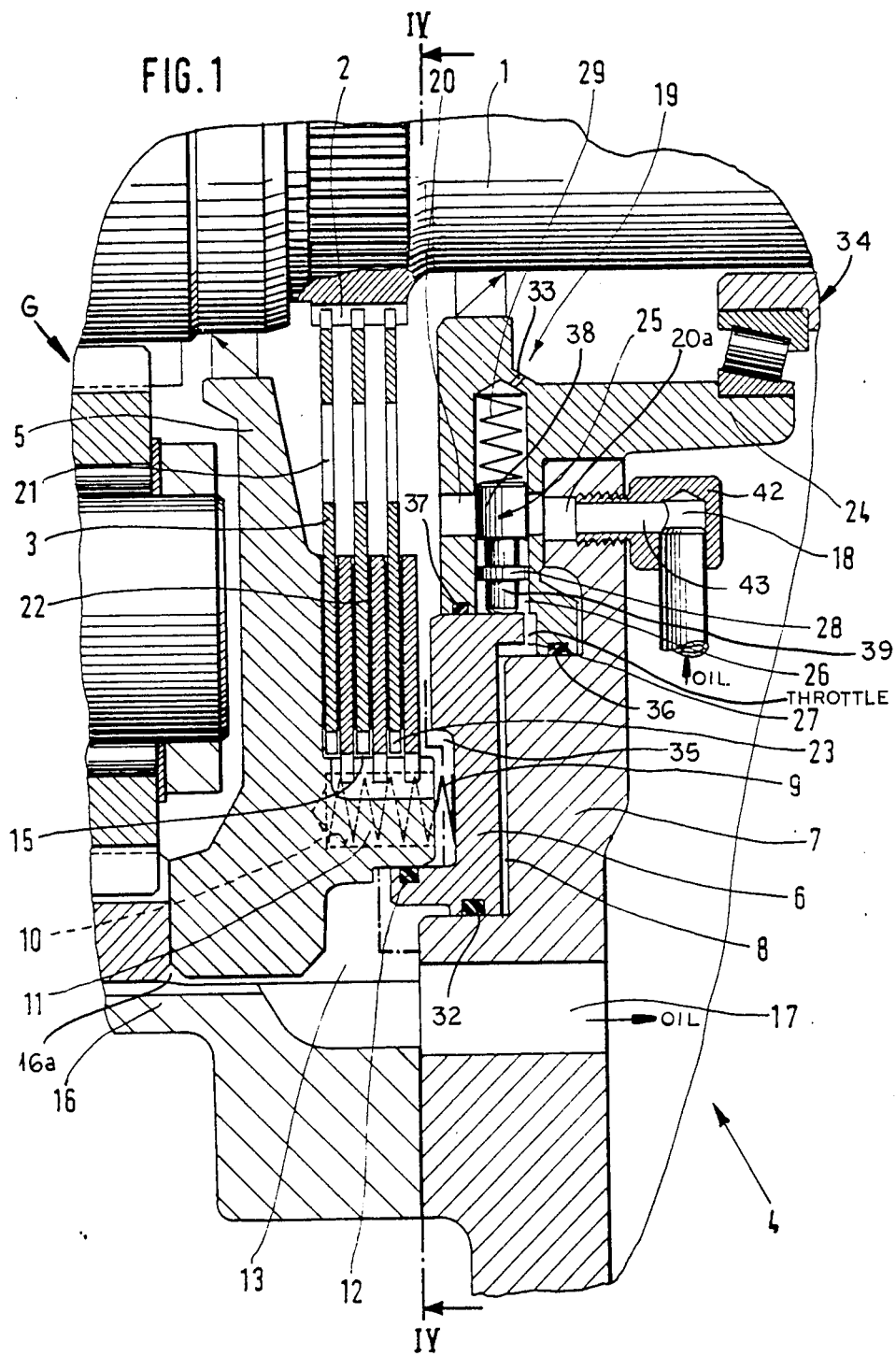
FIG. 1 is a longitudinal section of a brake associated to a gear unit and provided with a first embodiment of an arrangement according to the invention for cooling the brake.

In FIG. 1, we have shown our invention in connection with a brake assembly whose housing 4 is associated with a gearbox casing accommodating a gear unit G. The housing 4 supports a shaft 1 to which a brake disk support 2 is connected at a certain location on the shaft 1. The brake disk support 2 rotates with the shaft 1 and carries one or more displaceable brake disks 3 which are arranged parallel and spaced from each other by interposed friction lining disks 22. The friction areas are provided in conventional manner with radial grooves (not shown) so that uniformly spaced through-passages for the fluid, e.g. oil are arranged over the entire friction area. In the vicinity of its circumference, each brake disk 3 is provided with an annular through-opening 21 (FIG. 4) for a purpose to be described hereinbelow.

Cooperating with the brake disks 3 is a piston 6 which is located at one side of the disk assembly 3 whose other side rests against a counter plate 5 which is supported in the housing 4. In this connection, we may note that the counter plate 5 not only provides the counter pressure against the disks 3 engaged by the piston 6 but also has the function to separate the brake assembly from the gear unit G so that any undesired leaking of oil from the gear unit G into the brake assembly is avoided.

The piston 6 is movable in axial direction of the shaft 1 and is guided in a brake cylinder 8 defined by a front wall 7 of the housing 4. Accordingly, upon introduction of a pressure fluid (oil) into the brake cylinder 8 for example when pressing down the brake pedal of a vehicle—the piston 6 will be axially displaced by the pressure fluid toward the brake disks 3 to compact the disk packet and eventually brake the disks 3 and the shaft connected therewith.

In order to maintain the piston 6 in its initial position i.e. the position in which no engagement with the brake disks 3 takes place, a plurality of return springs 9 are provided acting upon the piston 6. The return springs 9 are arranged in respective spring pockets 10 provided in the counter plate 5 along its periphery or within an annular collar 11 which is molded to the plate 5. Thus one end of each return spring 9 is supported by the associated spring pocket 10 while the other end thereof abuts the piston 6.

The annular collar 11 which in case a plurality of disks is used has an external lamellar structure (multiple-disk brake) is arranged at a distance to the piston 6 so that a space 35 is defined therebetween and between the brake disks 3 and the piston 6.

The space 35 is sealed against an external annular space 13 by a sealing ring 12 which is arranged between the piston 6 and the collar 11. The external space 13 which surrounds the collar 11 can, however, communicate with an internal annular space 15 confined betwen the outer circumference of the brake disks 3 and the adjacent collar 11 via two through-passages 14.

Figure 4:
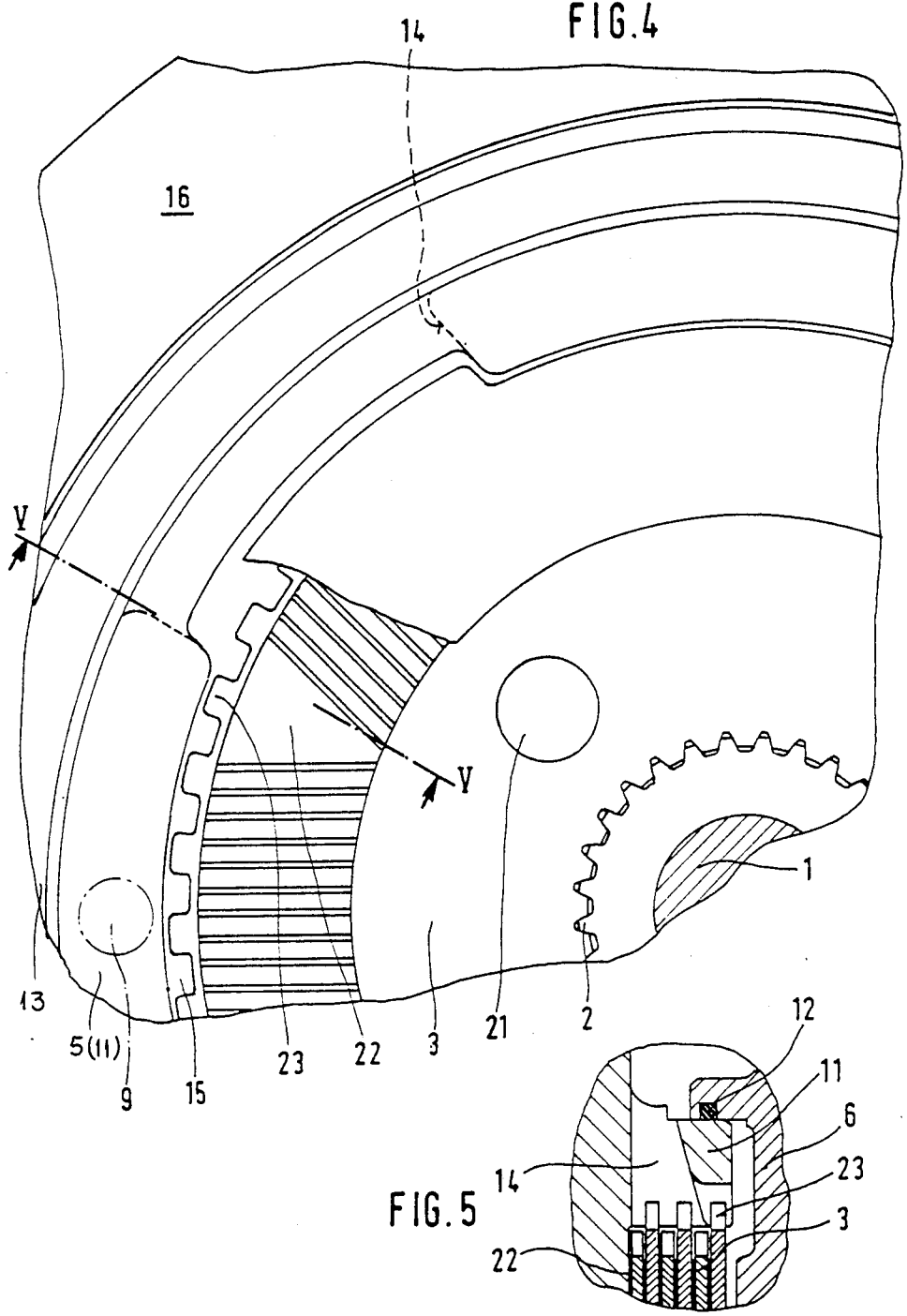
FIG. 4 is a sectional view taken along line IV—IV of FIG. 1.
Figure 5:
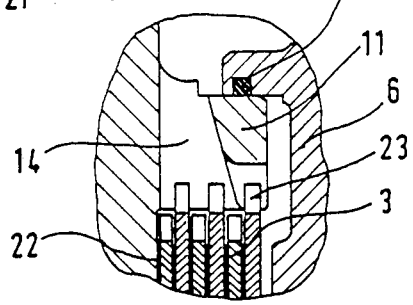
FIG. 5 is a sectional view taken along line V—V of FIG. 1.

Each of the through-passages 14 is arranged in the upper portion of the plate 5 or collar 11 as indicated in FIG. 4. Through the provision of these passages 14, oil which is collected in the space 15 can be discharged therefrom in a manner still to be described to the external space 13 from where the oil flows via a return pipe 17 to an oil sump (not shown).

The oil sump is further connected to a pressure pipe 18 which leads to a connecting piece 42 threaded to the front wall 7. The connecting piece accommodates a channel 43 which is in communication with a valve arrangement 19 to be described hereinbelow.

As we have shown especially in FIG. 4, each of the brake disks 3 is provided at its circumference with a toothed profile 23 so that oil collected in the internal space 15 which tightly surrounds the brake disks 3 can continuously and automatically be removed therefrom by the toothed profile of the rotating brake disks 3 and discharged to the external space 13. Thus, when the brake is not actuated the rotating disks 3 guaranted that no oil will be collected in vicinity of the brake assembly.

Figure 2:
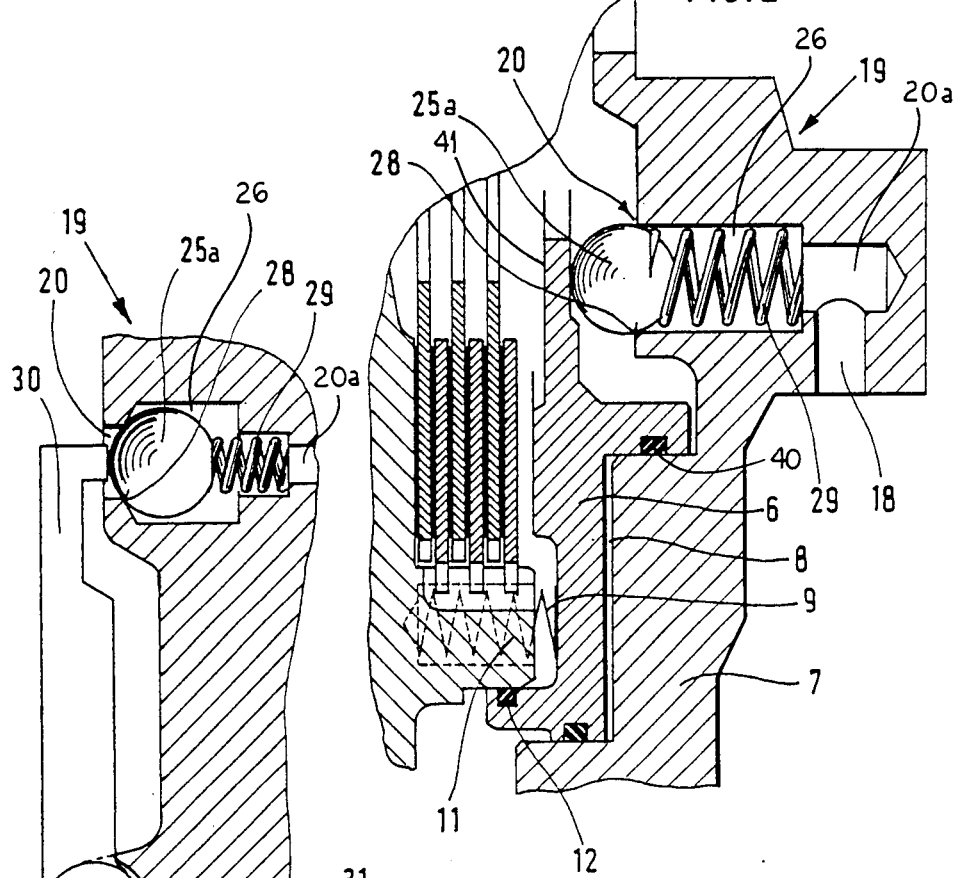
FIG. 2 is a longitudinal section of a second embodiment of the arrangement of FIG. 1.
Figure 3:
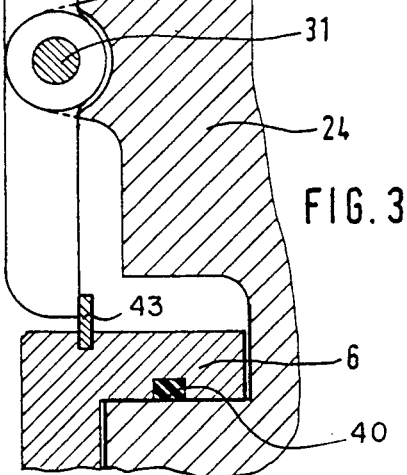
FIG. 3 is a longitudinal section of a third embodiment of the arrangement of FIG. 1.

As already mentioned, the oil sump is connected via the pressure pipe 18 with the valve arrangement 19 for cooling the brake disks before, during and after the braking action. The valve arrangement 19 includes one or more valves which can be housed either in a casing—in the embodiment of FIG. 1 casing or flanged ring 24—separated from the front wall 7 or may be accommodated in the front wall 7 (FIGS. 2 and 3).

Below we refer only to one of such valves but must emphasize that the casing 24 or the front wall 7 may house several of such valves. The casing 24 which is supported by respective means 34 and sealed against the front wall 7 and piston 6 by sealing rings 36, 37 accommodates a channel 20a which is essentially in alignment with the channel 43 of the connecting piece 42.

Arranged perpendicularly at an intermediate section of the channel 20a is a pressure chamber 26 in which a closing member 25 is slidable in order to control the outlet 20 of the channel 20a. The outlet 20 is arranged approximately at the same radial level as the through openings 21 of the brake disks and are radial within the actual friction area.

The closing member 25 includes a head portion 38 which has a diameter corresponding to the width of the chamber 26 so that in the closing position of the member 25 no fluid can be injected from the outlet 20 of the channel 20a.

Connected to the head portion 38 is a shaft 39 of smaller diameter which when the closing member 25 is moved into the open position allows the flow of fluid out of the channel 20a. At a predetermined location, the shaft 39 is provided with a flange portion 28 which has a diameter corresponding to the width of the chamber 26. Thus, when the fluid is introduced into the brake cylinder 8, the fluid acts firstly on the flanged portion 28—in view of the hydrostatic conditions—to slide the closing member into the opening position before the piston 6 is forced by the pressure fluid in the brake cylinder 8 to move and engage with the brake disks 3. The fluid which is pumped from the oil sump to the channel 20a is thus injected out of the outlet 20 and through the openings 21 of the disks 3 to provide an intensive cooling and simultaneous braking by utilizing centrifugal forces.

The closing memeber 25 is usually urged into the closing position by a return spring 29 whose one end acts upon the head portion 38 of the closing member 25. The other end of the return spring 29 abuts the end face of the chamber 26. Therefore, upon a pressure relief, the return spring pushes the closing member 25 into the closing position in order to seal off the channel 20a again.

The chamber 26 is further communicating with the brake cylinder 8 via a connection 27 so as to allow the fluid which flows into the brake cylinder during a desired brake action to act on the flange portion 28. We may note that the connection 27 can contain a return-flow throttle (not shown) so that the closing member 25—after being moved into the opening position—can be maintained in this position for a longer period than the piston 6, i.e. that the reset of the closing member 25 is delayed. In case air penetrates into the chamber 26, a ventilating opening 33 is arranged at the end face of the chamber 26. Orifice 33, if sufficiently small can provide the requisite delay with or without the checkvalve.

As can be seen from the FIG. 1, the piston 6 is further sealed against the front wall 7 by a sealing ring 32 so as to prevent leakage of fluid from the brake cylinder 8.

The design of the valve arrangement 19 which occupies approximately the same axial dimension as the piston 6 and the fact that the fluid is automatically and continuously removed from the brake disks 3 so that only very small ventilating passages are necessary allow to considerably reduce the structural dimensions.

Turning now to FIG. 2, we have shown a second embodiment of the valve arrangement 19. For reasons of simplicity, we have used in FIG. 2 the same reference numerals as in FIG. 1 for equivalent parts.

In this embodiment, the chamber 26 is in alignment with the channel 20a but is of wider diameter in order to support one end of the spring 29. The outlet 20 of the channel 20a is controlled by a spherical closing member 25a upon which the other end of the spring 29 acts. In order to keep the closing member 25a in the closing position when no braking action takes place, the piston 6 is provided with an extension 41 against which the closing member 25a abuts. Therefore the prestress of the spring is countered by the extension 41.

In case fluid e.g. oil is introduced into the brake cylinder 8, the piston 6 is moved against the brake disks 3. Simultaneously with the movement of the piston 6, the spring 29 pushes against the closing member 25a which thus follows the motion of the piston 6 to open the outlet 20. The return spring 9 of the piston 6 is thus subjected to a higher load while the return spring 29 acting on the closing member 25a is relieved. It is obvious that in this embodiment no connection between the chamber 26 and the brake cylinder 8 is necessary as the movement of the closing member 25a is obtained by mechanical means. Therefore, it is required to arrange a sealing ring 40 between the brake cylinder and the area of the closing member 25a.

In FIG. 3 a further embodiment of the valve arrangement 19 is illustrated which differs from the embodiment as shown in FIG. 2 in the actuation of the spherical closing member 25a. The opening of the closing member 25a is provided by a transmission formed by a lever 30 which is in engagement with the side of the closing member 25a opposite to the side upon which the spring 29 acts. Thus, the lever 30 counters the prestress applied by the spring 29 on the closing member 25a. The lever is further in engagement with a stop member 43 projecting from the piston 6 and is supported and guided in a bearing 31 located on the casing portion 24. The movement of the piston 6 is therefore transmitted to the lever 30 so that the spring 29 pushes the closing member 25a into its opening position.

With regard to the embodiments as shown in FIGS. 2 and 3, we may note that the mechanical connection between the closing member 25a and the piston 6 may include a transmission (not shown) between the distance covered by the piston 6 and the stroke of the closing member 25a in order to open the outlet 20 to a considerable degree upon beginning of movement of the piston toward the brake disks 3.

We claim:

1. A friction device, comprising:
   a housing;
   a rotatable shaft supported in said housing;
   at least one friction disk connected to said shaft so as to be rotatable therewith, said friction disk being provided with at least one through-opening;
   cooperating means accommodated in said housing and engageable with said friction disk;
   control means associated with said housing and operatively connected with said cooperating means for providing a cooling effect of said friction disk, said control means including at least one valve formed in said housing at a fixed location with respect to said shaft regulating the flow of a fluid through a channel whose outlet is approximately axially juxtaposed with said through-opening, said valve being constructed and arranged to open only upon actuation of said friction disk to supply said fluid thereto; and
   discharge means for continuously removing fluid from said friction disk.

2. A device as defined in claim 1 wherein said cooperating means includes a cylinder defined by said housing, a piston movable towards one side of said friction disk when fluid is introduced into said cylinder and a counter plate arranged at the other side of said friction disk to provide a counter pressure once said piston presses against said friction disk, said counter plate being provided with an annular colla surrounding said friction disk so as to define an internal annular space therebetween in which fluid injected to cool said friction disk is collected.

3. A device as defined in claim 2 wherein said annular collar has an external lamellar structure when surrounding a plurality of friction disks, said lamellar structure being fixed against rotation and guided in an axially displaceable manner.

4. A device as defined in claim 3 wherein a plurality of such valves is arranged along a circle, said external lamellar structure having an inner diameter larger than that of said circle.

5. A device as defined in claim 2 wherein said annular collar accommodates at least one pocket along its periphery, said cooperating means further including at least one return spring arranged in a respective one of said pockets so as to prestress said piston out of engagement with said friction disk.

6. A device as defined in claim 2 wherein said cooperating means and said housing define an external annular space, said annular collar being provided with at least one passage for providing a connection between said external space and said internal space.

7. A device as defined in claim 6 wherein said discharge means includes a toothed profile arranged at the circumference of said friction disk so that the fluid collected in said internal annular space is continuously forced to flow from said internal space through said passage into said external space upon rotational movement of said friction disk.

8. A device as defined in claim 1 wherein said shaft defines an axis, said channel extending coaxially to said shaft so as to be at an angle of 90° with respect to said friction disk.

9. A device as defined in claim 1, further comprising a casing for accommodating said control means, said casing being a separate structural unit arranged between said shaft and said housing.

10. A device as defined in claim 6 wherein said housing is part of an adjacent gearbox casing whose return pipe for a respective fluid is in communication with said external annular space.

11. A device as defined in claim 2, further comprising actuating means for regulating said valve in such a manner that said valve opens said outlet of said channel before said piston engages with said friction disk.

12. A device as defined in claim 2 wherein said control means further includes a spring acting on said valve to urge the latter into a position closing said outlet, said valve being movable in a chamber perpendicularly arranged with respect to said channel and having a flange portion on which the fluid intorduced into said cylinder acts to move said valve against the force of said spring into a position opening said outlet.

13. A device as defined in claim 12, further comprising throttle means associated with said valve for delaying the movement of the latter from the opening position into the closing position.

14. A friction device, comprising:
a housing;
a rotatable shaft supported in said housing:
at least one friction disk connected to said shaft so as to be rotatable therewith, said friction disk being provided with at least one through-opening;
cooperating means accommodated in said housing and engageable with said friction disk;
control means associated with said housing and operatively connected with said cooperating means for providing a cooling effect of said friction disk, said control means including at least one valve regulating the flow of a fluid through a channel whose outlet is approximately at the level of said through-opening; and
discharge means for continuously removing fluid from said friction disk, said cooperating means including a cylinder defined by said housing, a piston movable towards one side of said friction disk when fluid is introduced into said cylinder and a counter plate arranged at the other side of said friction disk to provide a counter pressure once said piston presses against said friction disk, said counter plate being provided with an annular collar surrounding said friction disk so as to define an internal annular space therebetween in which fluid injected to cool said friction disk is collected, said control means including mechanical means for moving said valve coaxially with said piston between a position in which the outlet is opened and a position in which the outlet is closed.

15. A device as defined in claim 14 wherein said valve is a spherical closing member, said mechanical means including a spring acting acting on said closing member to urge the latter into the position in which the outlet is opened and an extension rod connected to said piston to counter the force applied by said spring onto said closing member and to keep said closing member in the closing position as long as no fluid is introduced into said cylinder.

16. A device as defined in claim 14 wherein said valve is a spherical closing member, said mechanical means including a spring acting on said closing member to urge the latter into the position in which the outlet is opened and a lever assembly cooperating with said piston to counter the force applied by said spring onto said closing member and to keep said closing member in the closing position as long as no fluid is introduced into said cylinder.

17. A device as defined in claim 14 wherein said mechanical means further includes a transmission between the movement of said piston and the stroke of said valve so as to open the outlet to a considerable degree upon beginning movement of said piston.

18. The device defined in claim 1 wherein said cooperating means includes an annular friction disk peripherally engaging said housing and axially movable therein, said housing being provided with an annular shoulder member confronting said disks on one axial side thereof and an annular plate member engageable with said disks on the opposite axial side thereof, said valve being provided in a valve passage turned toward said disks, said annular friction disk having an inner diameter greater than the maximum radial distance of said passage from the axis of said shaft and being axially shiftably mounted on one of said members.

19. The device defined in claim 18, further comprising means for delaying closing of said valve.

20. A friction device comprising:
a housing;
a rotatable shaft supported in said housing;
at least one friction disk connected to said shaft so as to be rotatable therewith, said friction disk being provided with at least one through-opening;
cooperating means accommodated in said housing and engageable with said friction disk;
control means associated with said housing and operatively connected with said cooperating means for providing a cooling effect of said friction disk, said control means including at least one valve regulating the flow of a fluid through a channel whose outlet is approximately at the level of said through-opening; and
discharge means for continuously removing fluid from said friction disk, said cooperating means including an annular friction disk peripherally engaging said housing and axially movable therein, said housing being provided with an annular shoulder member confronting said disks on one axial side thereof and an annular plate member engageable with said disks on the opposite axial side thereof, said valve being provided in a valve passage turned toward said disks, said annular friction disk having an inner diameter greater than the maximum radial distance of said passage from the axis of said shaft and being axially shiftably mounted on one of said members, a piston being provided to actuate the disks, said device further comprising a mechanical displacement-multiplying linkage between said piston and said valve for fully opening said valve upon initiation of movement of said piston.

* * * * *